Patented Sept. 5, 1922.

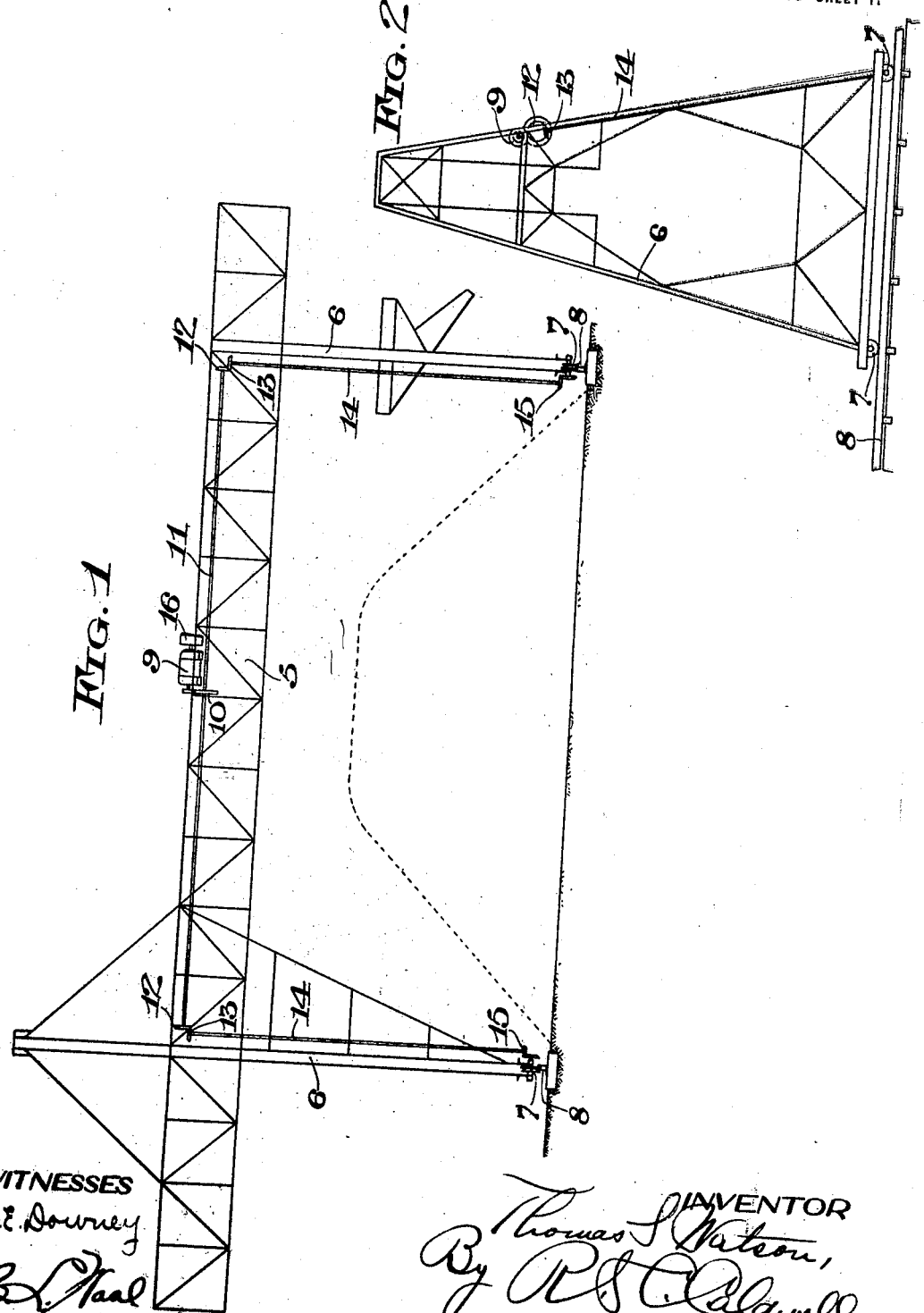

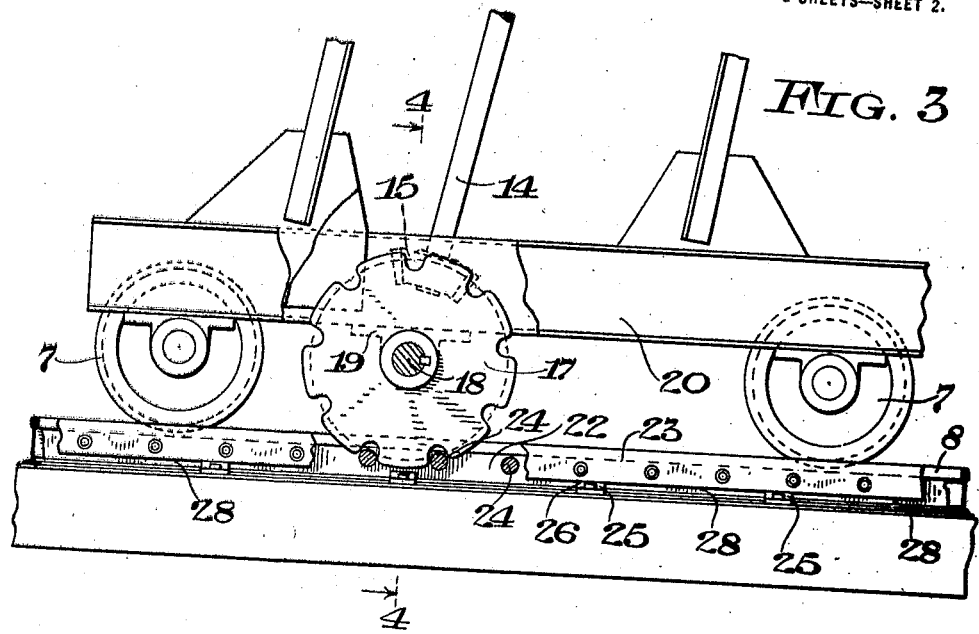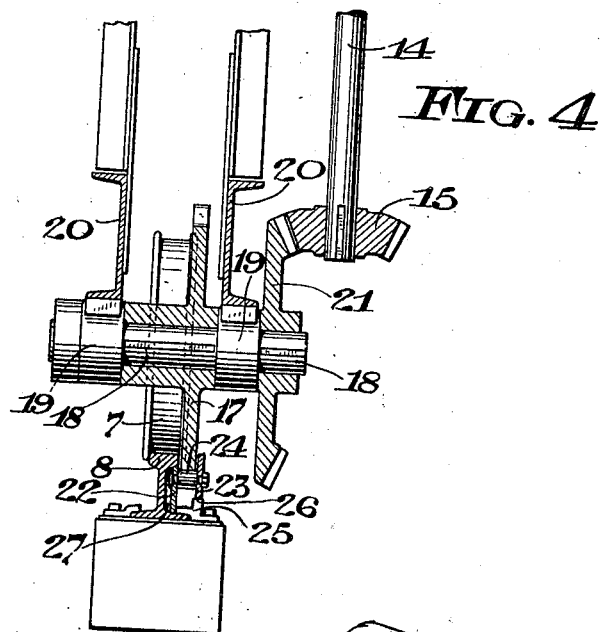

1,427,990

UNITED STATES PATENT OFFICE.

THOMAS S. WATSON, OF MILWAUKEE, WISCONSIN.

RUNNING GEAR FOR CONVEYING STRUCTURES.

Original application filed September 27, 1920, Serial No. 413,017. Divided and this application filed January 26, 1922. Serial No. 531,883.

*To all whom it may concern:*

Be it known that I, THOMAS S. WATSON, a citizen of the United States, and resident of Milwaukee, in the county of Milwaukee and State of Wisconsin, have invented new and useful Improvements in Running Gears for Conveying Structures, of which the following is a description, reference being had to the accompanying drawings, which are a part of this specification.

The invention relates to conveying structures.

This application constitutes a division of my copending application for conveying structures, Serial No. 413,017, filed September 27, 1920, and relates more particularly to the running gear of the conveying structure.

The object of this invention is to provide a running gear for positively driving the propelling structure along the supporting rails by means of a propelling gear and pin rack, the pin rack being associated in a novel manner with the supporting rail.

The invention further consists in the several features hereinafter set forth and more particularly defined by claims at the conclusion hereof.

In the drawings: Fig. 1 is a side elevation of a conveying structure provided with running gear embodying the invention; Fig. 2 is an end elevation of the structure shown in Fig. 1; Fig. 3 is a detail side view of one of the propelling trucks, parts being broken away and parts being in section, and Fig. 4 is a section taken on the line 4—4 of Fig. 3.

Referring to the drawings, the illustrated conveying structure comprises a conveying bridge 5, the trucks 6 of which are mounted on wheels 7 running on rails 8. A motor 9 is mounted on the bridge and through gearing 10 drives a line shaft 11 which carries bevel gears 12 meshing with similar gears 13 on transmission shafts 14 carrying gears 15. A brake 16, either of the mechanical or dynamic type, is used for stopping the rotation of the shaft 11.

The running gear embodying the invention includes the wheels 7 and supporting rails 8 and driving mechanism for the trucks 6, including a propelling wheel 17 and a pin rack hereinafter described.

The propelling wheel 17 is mounted on a shaft 18 journalled in bearings 19 on the truck frame members 20 and carrying a gear 21 meshing with the gear 15.

The pin rack or driving track is formed by spaced plates 22 and 23 carrying transverse pins 24 spaced at regular intervals along the plates forming a rack. The wheel 17 has teeth, the advancing sides of which are adapted to engage the pins as said wheel is driven to thereby positively drive each leg of the bridge. The plates 22 are disposed in upright position between the head and base of the rail 8 and are secured thereto at intervals by clamps 25 which also engage the base of the rail and serve as rail clamps. These clamps 25 have a top surface 26 upon which the plates 23 rest. With this construction, as the plates are not rigidly connected with the rail, the rail may expand and contract independently of the rack, and dirt and dust are excluded from the space 27 between the rail 8 and the plate 22. The plate 23 is elevated above the roadbed by the rail clamp 25, thus providing open spaces 28 between said plate and the roadbed so that the pins 24 may be easily kept clean and clear of any foreign matter. The pins 24 may be of one piece or they may have a roller portion engaged by the wheel 17. The weight of the conveying structure is taken by the rails 8 so that the driving pins are relieved of any strain occasioned by this weight. In practice the rack is anchored at each end of the yards in any suitable manner.

I desire it to be understood that this invention is not to be limited to any specific form or arrangement of parts except in so far as such limitations are specified in the claims.

What I claim as my invention is:

1. Running gear for conveying structures comprising a truck, a rail, supporting and guide wheels for said truck and running on said rail, a plate abutting one side of the rail, anchoring means securing the rail to the roadbed and the plate to the rail, another plate supported on said anchoring means above the roadbed and spaced from the first named plate, transversely disposed pins joining said plates together and coacting therewith to form a pin rack, and a propelling wheel on the truck engageable with said rack.

2. Running gear for conveying structures comprising a truck, a rail, supporting and guide wheels for said truck and running on said rail, a plate secured against one side of the rail, another plate supported above the roadbed and spaced from the first named plate, transversely disposed pins joining said plates together and coacting therewith to form a pin rack, and a propelling wheel on the truck engageable with said rack.

3. Running gear for conveying structures comprising a truck, a rail, supporting and guide wheels for said truck and running on said rail, a plate disposed against one side of the rail, anchoring means securing the rail to the roadbed, another plate supported on said anchoring means and spaced from the first named plate, transversely disposed pins joining said plates together and coacting therewith to form a pin rack, and a propelling wheel on the truck engageable with said rack.

4. Running gear for conveying structures comprising a truck, a rail, supporting and guide wheels carried by the truck and running on said rail, a plate disposed against one side of the rail, anchoring means securing the rail to the roadbed and the plate to the rail, another plate spaced from the roadbed and from said first named plate, transversely disposed pins joining said plates together and coacting therewith to form a pin rack, and a propelling wheel on the truck engageable with said rack.

In testimony whereof I affix my signature.

THOMAS S. WATSON.